United States Patent [19]

DiGiovanni et al.

[11] Patent Number: 5,584,109
[45] Date of Patent: Dec. 17, 1996

[54] METHOD OF MAKING A BATTERY PLATE

[75] Inventors: Anthony P. DiGiovanni; Tao Li, both of Deland, Fla.

[73] Assignee: Memtec America Corp., Timonium, Md.

[21] Appl. No.: 263,542

[22] Filed: Jun. 22, 1994

[51] Int. Cl.⁶ .................................................. H01M 4/72
[52] U.S. Cl. ..................... 29/2; 429/233; 429/235; 429/241; 429/245; 428/222; 428/298; 428/368
[58] Field of Search .................................. 29/2; 429/233, 429/235, 241, 245; 428/222, 298, 368

[56] References Cited

U.S. PATENT DOCUMENTS

| | | |
|---|---|---|
| 1,934,643 | 11/1933 | Rafton . |
| 2,050,298 | 8/1936 | Everett . |
| 2,215,477 | 9/1940 | Pipkin . |
| 2,616,165 | 11/1952 | Brennan . |
| 3,127,668 | 4/1964 | Troy . |
| 3,161,478 | 12/1964 | Chessin . |
| 3,262,815 | 7/1966 | Langer et al. . |
| 3,277,564 | 3/1963 | Webber et al. . |
| 3,310,387 | 3/1967 | Sump et al. . |
| 3,341,446 | 9/1967 | Vielstich et al. . |
| 3,378,999 | 4/1968 | Roberts et al. . |
| 3,379,000 | 4/1968 | Webber et al. . |
| 3,503,200 | 3/1970 | Roberts et al. . |
| 3,540,114 | 11/1970 | Roberts et al. . |
| 3,657,014 | 4/1972 | Faber . |
| 3,694,325 | 9/1972 | Katz et al. . |
| 3,698,863 | 10/1972 | Roberts et al. . |
| 3,740,834 | 6/1973 | Douglass . |
| 3,905,831 | 9/1975 | Brown et al. . |
| 3,973,059 | 8/1976 | Brown et al. . |
| 3,977,070 | 8/1976 | Schildbach . |
| 4,044,447 | 8/1977 | Hamada et al. . |
| 4,115,528 | 9/1978 | Christner et al. . |
| 4,118,845 | 10/1978 | Schildbach . |
| 4,206,271 | 6/1980 | Norling et al. . |
| 4,251,603 | 2/1981 | Matsumoto et al. . |
| 4,265,703 | 5/1981 | Terliska . |
| 4,371,742 | 2/1983 | Manly . |
| 4,394,244 | 7/1983 | Divisek et al. . |
| 4,408,255 | 10/1983 | Adkins . |
| 4,435,252 | 3/1984 | Kadija . |
| 4,448,856 | 5/1984 | Zuckerbrod et al. . |
| 4,456,521 | 6/1984 | Solomon et al. . |
| 4,471,015 | 9/1984 | Ebneth et al. . |
| 4,500,647 | 2/1985 | Solomon . |
| 4,506,028 | 3/1985 | Fukuda et al. . |
| 4,518,705 | 5/1985 | Solomon et al. . |
| 4,597,028 | 6/1986 | Yoshida et al. . |
| 4,628,593 | 12/1986 | Fritts et al. . |
| 4,643,940 | 2/1987 | Shaw et al. . |
| 4,664,971 | 5/1987 | Soens . |

(List continued on next page.)

FOREIGN PATENT DOCUMENTS

| | | |
|---|---|---|
| 0074263 | 9/1981 | European Pat. Off. . |
| 821690 | 10/1959 | United Kingdom . |
| 942513 | 11/1963 | United Kingdom . |

OTHER PUBLICATIONS

Fiber Metallurgy, Metcalf et al., "Metal Progress," Mar. 1955, pp. 81–84.

Fiber Metals: A New Adventure in Engineering Materials, "The Iron Age", Jan. 24, 1963, pp. 53–55.

Carbon Blacks as Cathode Materials for Recheagable Lithium Cells, J. Electrochem. Soc: Electrochemical Science and Technology, Jun., 1987, pp. 1318–1321.

*Primary Examiner*—Maria Nuzzolillo
*Attorney, Agent, or Firm*—Frijouf, Rust & Pyle, P.A.

[57] ABSTRACT

An improved battery plate and method of making for an electric storage battery. The battery plate comprises a plurality of metallic fibers of a single or plural diameters randomly oriented and sintered to provide a conductive battery plate with a multiplicity of pores defined therein. The metallic fibers are formed by cladding and drawing a plurality of metallic wires to provide a fiber tow. The fiber tow is severed and the cladding is removed to form metallic fibers. The metallic fibers are arranged into a web and sintered to form the battery plate.

15 Claims, 5 Drawing Sheets

U.S. PATENT DOCUMENTS

| | | |
|---|---|---|
| 4,670,214 | 6/1987 | Magnuson et al. . |
| 4,737,889 | 4/1988 | Nishino et al. . |
| 4,743,349 | 5/1988 | Bachot et al. . |
| 4,785,136 | 11/1988 | Mollet et al. . |
| 4,874,677 | 10/1989 | Reiche et al. . |
| 4,885,120 | 12/1989 | McQuillan et al. . |
| 4,925,539 | 5/1990 | Francois . |
| 4,940,524 | 7/1990 | Perineau et al. . |
| 4,944,991 | 7/1990 | Karas et al. . |
| 4,990,490 | 2/1991 | Pathare et al. . |
| 5,011,638 | 4/1991 | Pinkasov . |
| 5,028,490 | 7/1991 | Koskenmaki et al. . |
| 5,071,713 | 12/1991 | Francois . |
| 5,076,898 | 12/1991 | Nidola et al. . |
| 5,080,963 | 1/1992 | Tatarchuk et al. . |
| 5,102,745 | 4/1992 | Tatarchuk et al. . |
| 5,106,707 | 4/1992 | Catotti et al. . |
| 5,137,782 | 8/1992 | Adriaensen et al. . |
| 5,153,057 | 10/1992 | Corbett et al. . |
| 5,158,828 | 10/1992 | Sudani et al. . |
| 5,165,985 | 11/1992 | Wiste et al. . |
| 5,200,281 | 4/1993 | Leap et al. . |
| 5,200,282 | 4/1993 | Ohnishi et al. . |
| 5,226,210 | 7/1992 | Koskenmaki et al. . |
| 5,244,758 | 9/1993 | Bronoel et al. . |
| 5,304,330 | 4/1993 | Tatarchuk et al. . |

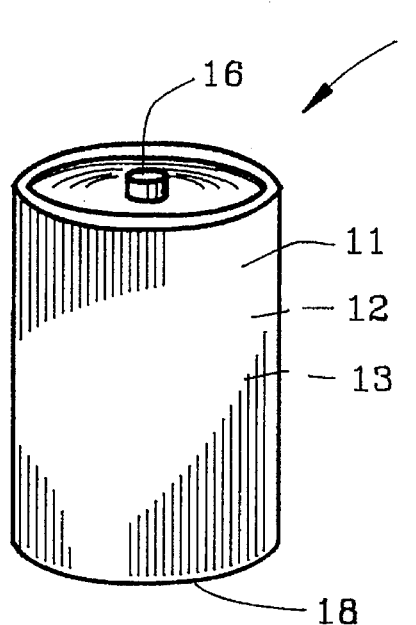
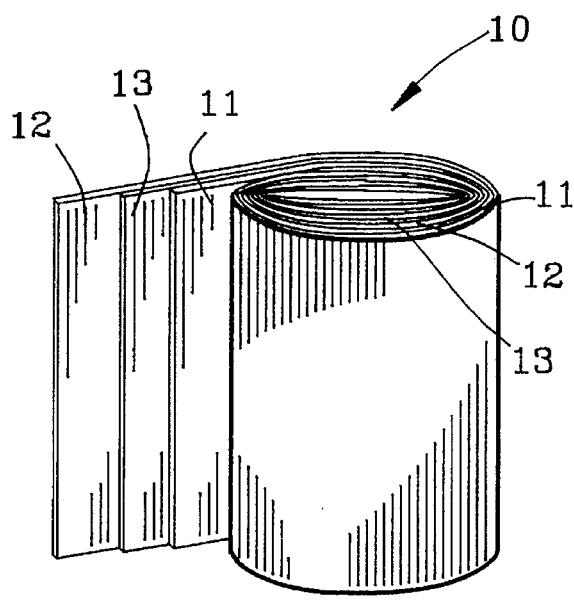
FIG. 1    FIG. 2
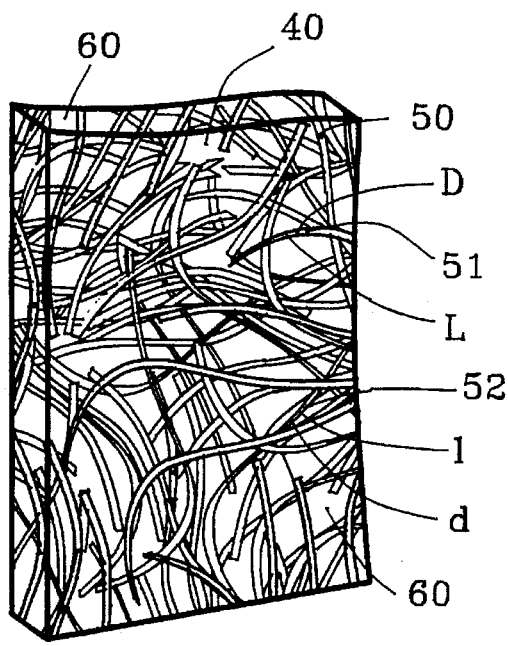
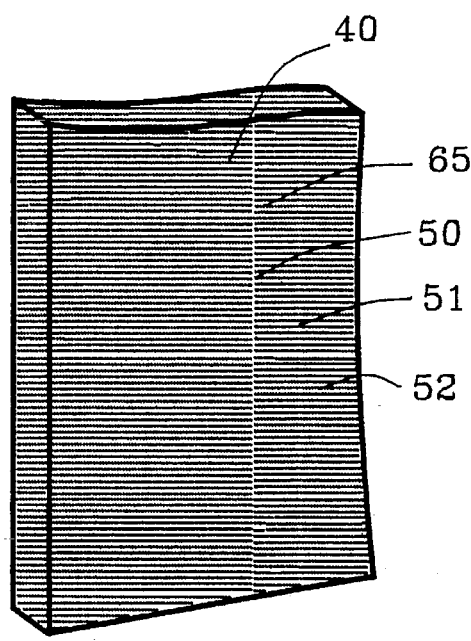
FIG. 3    FIG. 4

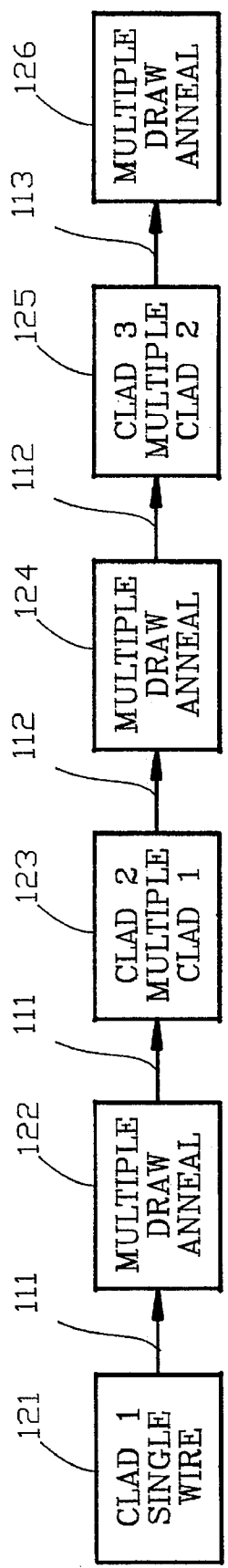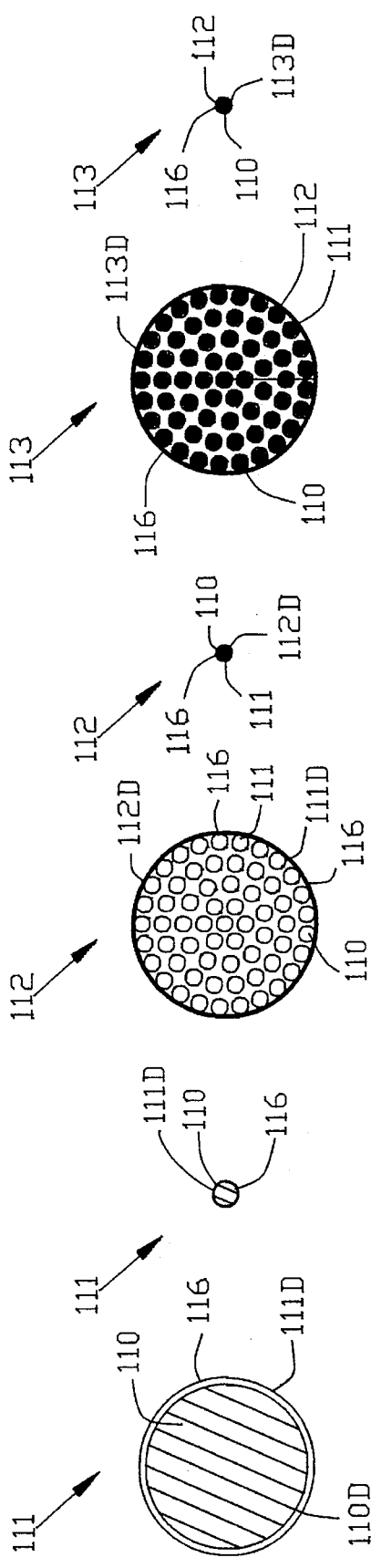
FIG. 5

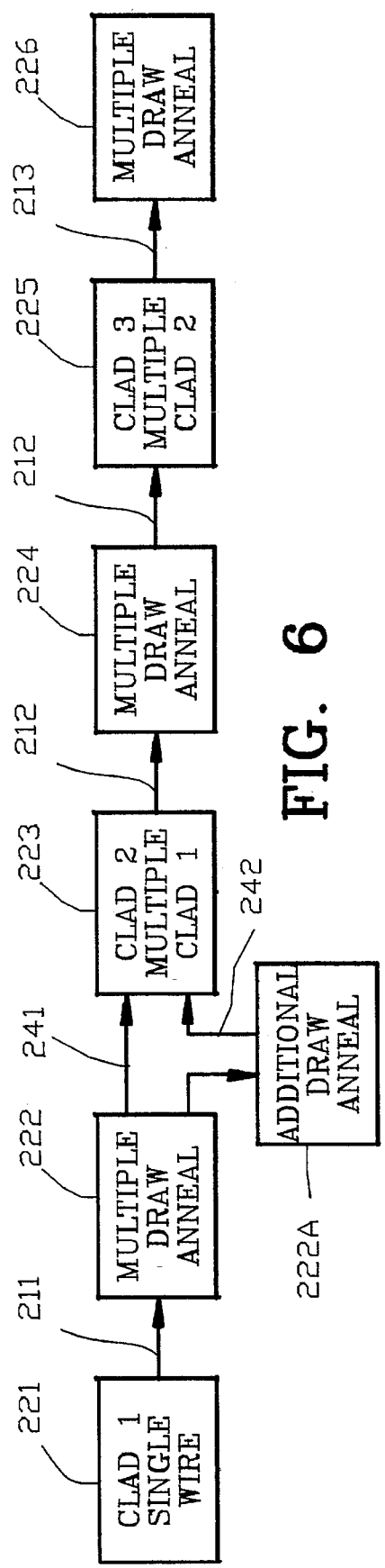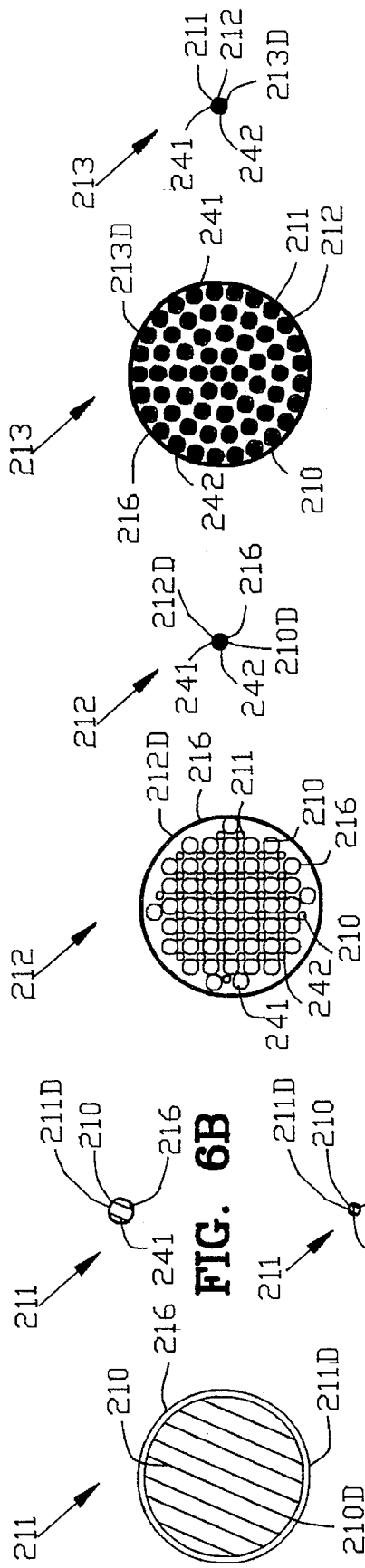

METHOD OF MAKING A BATTERY PLATE

BACKGROUND OF THE INVENTION

1. Field of the Invention

This invention relates to an improved battery plate for an electrical storage battery. More particularly, this invention relates to the method and apparatus of an improved battery plate fabricated with a fused web of metallic fibers.

2. Background of the Invention

For over one hundred years, electric storage batteries have provided portable and instantaneous electric power for a variety of electrical devices. Electric storage batteries include an anode and a cathode fabricated from dissimilar materials with an electrolyte interposed therebetween. An ionic exchange between the anode and the cathode through the electrolyte generates an electrical potential between the anode and the cathode. When the anode and the cathode are interconnected by an external load, an electric current is provided through a flow of ions through the electrolyte.

The electrical potential produced between the anode and the cathode is determined by the dissimilar materials used for constructing the anode and the cathode. The current produced by an electric storage battery is partially determined by the surface area of the anode and the cathode.

All electric storage batteries have an internal resistance which limits the maximum current flow that can be generated by the electric storage battery. The maximum current flow that can be generated by the electric storage battery is commonly referred to as short circuit current. The short circuit current is the maximum current the electric storage battery can produce when the anode is externally shorted to the cathode with a large conductor.

In an effort to increase the surface area of the anode and the cathode, many electric storage batteries use a plurality of anode and cathode pairs within each battery cell. A separator is interposed between each anode and cathode pair with the anodes and cathodes being respectively connected in electrical parallel within each cell. The plurality of anode and cathode pairs within each battery cell increases the surface area of the anode and cathode for increasing the short circuit current of the cell.

In many cases, the anode and the cathode are each fabricated from a combination of materials in an effort to reduce the weight and cost of the electric storage battery and to increase the efficiency thereof. In such cases, each of the anode and the cathode is fabricated with a conductive battery plate having a multiplicity of pores for receiving an active material therein.

Typically the battery plate is fabricated from a metallic material defining a multiplicity of pores for receiving all active material therein. In some cases, the battery plate is fabricated from an insulating material coated with a conductive material. The insulating material defines a multiplicity of pores for receiving an active material therein.

The battery plate must be mechanically strong in order to maintain the active material within the multiplicity of pores within the battery plate. Under certain conditions, a vibration and other mechanical impacts may cause the active material to dislodge or separate from the battery plate thereby reducing efficiency of the electrical storage battery.

In some electric storage battery configurations, the battery plates including the active material are rolled to form a cylindrical configuration to provide a cylindrically shaped electric storage battery. During the rolling process, the battery plates and the active material are subjected to substantial stresses during the rolling process. Any fracture of a portion of the battery plate will result in a reduced conductivity of the battery plate and accordingly a reduction in the current output of the electric storage battery.

Many portable devices of the prior art utilize rechargeable batteries such as nickel cadmium, nickel hydride and other types of rechargeable batteries which enable the battery to be discharged and recharged hundreds or in some cases thousands of times. A rechargeable battery must be designed and fabricated to withstand the charging and recharging as well as an extended life of the rechargeable battery.

In addition, the prior art is striving to continue to reduce the weight of batteries in order to reduce the overall weight of many portable device such as radios, televisions, telephones, computers, games and the like. In order to reduce the weight of the battery, the prior art has utilized various materials for the battery plates of electric storage batteries.

U.S. Pat. No. 3,262,815 to Langer et. al. discloses an electrode suitable for a secondary battery comprising a plate formed from a compact body of intermingled fine metal fibers, the majority of the fibers extending the full height of the plate and a small proportion extending transverse thereto, the fine metal fibers having a generally parallel lineal orientation in one direction and an active electrode material distributed on and disposed within the body of the metal fibers, a liquid electrolyte permeable sheet wrapping enclosing the plate, an electrical contact attached to the plate transverse to the general lineal orientation of the fine metal fibers whereby most of the fibers are directly connected thereto, an electrical lead attached to the electrical contact, and an insulated covering about the lead and the contact.

U.S. Pat. No. 4,206,271 to Norling el. al. discloses a method for the manufacture of a highly porous nickel electrode body for electrical accumulators. The new electrode body is also disclosed. By using 5–7% volume of a nickel powder in admixture with 93–95% by volume of a pore-forming agent selected from the group consisting of ammonium bicarbonate and ammonium carbonate when pressing and sintering the electrode body a very high porosity is obtained, such as 90–95%, in spite of which the mechanical strength of the body is so high as to resist the strains of an accumulator cell. Especially preferable to impart outstanding strength to the electrode body, is a pressure of at least 100 MPa in the pressing operation.

U.S. Pat. No. 4,251,603 to Matsumoto et. al. discloses a battery electrode comprising a plaque made of a sponge-like porous metal matrix having a multiplicity of cells connected with each other in three-dimensions, wherein the sectional area of the gratings making up the sponge-like metal porous plaque decreases continuously along the thickness of the plaque from the surface toward the central part and an active material is impregnated in the porous plaque.

U.S. Pat. No. 4,628,593 to Fritts et. al. discloses a low shear battery plaque and a nickel electrode fabricated therefrom, the latter consisting essentially of a centrally located layer of a conductive felt, layers of sintered nickel on each side of the felt and nickel hydroxide active material disposed throughout the pores of the sintered nickel.

U.S. Pat. No. 5,080,963 to Tatarchuk et. al. discloses a new class of composite results from a matrix of carbon fibers, including graphite fibers, interwoven in a network of fused metal fibers. The composites can be fabricated to have varying surface area, void volume and pore size while maintaining high electrical conductivity. Composites are readily prepared from a preform of a dispersion of carbon fibers, metal fibers, and an organic binder such as cellulose, by heating the preform at a temperature sufficient to fuse the metal fibers and to volatilize at least 90% of the binder with a loss of less than about 25%, and usually under 10%, by weight of carbon fiber.

U.S. Pat. No. 5,106,707 to Catotti et. al. discloses a sealed rechargeable nickel electrode containing an electrochemical cell having a pasted negative electrode with paste layers adhered to a nonforminous conductive substrate, which retards growth (swelling) of the nickel electrode on cycling.

U.S. Pat. No. 5,200,281 to Leap et. al. discloses a sintered bipolar battery plate (10) which is made containing two porous electrodes and a central, non-porous, metallic cell separator-current collector sheet (12) where the positive electrode contains sintered particles (14) of elemental silver sintered into an expanded metal sheet (18) and the negative electrode contains sintered particles (16) of elemental iron sintered into an expanded metal sheet (18), where the positive and negative electrodes are sintered to a thin, porous, metallic connection layer (20) selected from at least one of nickel fiber or nickel powder, which is sintered to the current collector (12). This plate (10) can be placed in a case (22) containing alkali hydroxide electrolyte and having metal end plates (29) for electrical connections.

U.S. Pat. 5,200,282 to Masuhiro et. al. discloses a nickel electrode for use in an alkaline battery using a network-like alkaline-proof metal mesh having pores at the inside thereof as a core metal current collector, as well as an alkaline battery using such a nickel electrode. Inexpensive nickel electrode having high performance, great capacity can be obtained at high productivity.

U.S. Pat. No. 5,244,758 to Bronoel et. al. discloses a positive nickel electrode having a structure of cellular nickel foam filled with a paste based on nickel hydroxide. The paste contains (in dry matter and per 100 parts by weight nickel hydroxide) 7 to 8 parts by weight powder-form nickel metal, 5 to 12 parts by weight of a cobalt hydroxide and/or salt, the parts by weight being expressed as equivalents of cobalt metal.

Although the aforementioned prior art have advanced the battery art, there is a need for further advancement in the battery art especially in the fabrication of the battery plates therefore.

Therefore, it is an object of this invention to provide an improved battery plate for an electric storage battery fabricated of a matrix of randomly oriented metallic fibers wherein the metallic fibers are fused to adjacent fibers to provide an electrically conductive porous battery plate with a high total energy density as well as high strength.

Another object of this invention is to provide an improved battery plate for an electric storage battery fabricated of a matrix of randomly oriented metallic fibers wherein the metallic fibers are sintered to fuse the metallic fibers into an electrically conductive porous battery plate.

Another object of this invention is to provide an improved battery plate for an electric storage battery fabricated of a sintered matrix of randomly oriented metallic fibers wherein each of the metallic fibers have a substantially equal length and a substantially uniform cross-sectional area.

Another object of this invention is to provide an improved battery plate for an electric storage battery fabricated of a sintered matrix of randomly oriented metallic fibers wherein each of the metallic fibers has a substantially cylindrical shape for increasing the surface area of the battery plate.

Another object of this invention is to provide an improved battery plate for an electric storage battery fabricated of a sintered matrix of randomly oriented metallic fibers for providing a multiplicity of pores defined between adjacent fibers.

Another object of this invention is to provide an improved battery plate for an electric storage battery fabricated of a sintered matrix of randomly oriented metallic fibers for providing a multiplicity of pores defined between adjacent fibers for interlocking an active plate material into the multiplicity of pores of the battery plate.

Another object of this invention is to provide an improved battery plate for an electric storage battery fabricated of a sintered matrix of randomly oriented metallic fibers for providing a battery plate wherein the porosity of the battery plate can be accurately controlled.

Another object of this invention is to provide an improved battery plate for an electric storage battery fabricated of a sintered matrix of randomly oriented metallic fibers comprising a multiplicity of major diameter fibers and a multiplicity of minor diameter fibers sintered to provide a highly conductive battery plate.

Another object of this invention is to provide an improved battery plate for an electric storage battery fabricated of a sintered matrix of randomly oriented metallic fibers with increased porosity and increased conductivity over the battery plates known to the prior art.

Another object of this invention is to provide an improved battery plate for an electric storage battery fabricated of a sintered matrix of randomly oriented metallic fibers having a higher porosity and capable of receiving substantially more active plate material than the battery plates of the prior art.

Another object of this invention is to provide an improved battery plate for an electric storage battery fabricated of a sintered matrix of randomly oriented metallic fibers having a porosity of greater than 95 percent.

Another object of this invention is to provide an improved battery plate for an electric storage battery fabricated of a sintered matrix of randomly oriented metallic fibers which may be rolled in a cylindrical configuration without deterioration of the electrical contact or bond between adjacent fused metallic fibers.

Another object of this invention is to provide an improved battery plate for an electric storage battery fabricated of a sintered matrix of randomly oriented metallic fibers with the metallic fibers having one or more diameters uniformly distributed within the matrix.

Another object of this invention is to provide an improved battery plate for an electric storage battery fabricated of a sintered matrix of randomly oriented metallic fibers wherein the metallic fibers may be preferentially disposed in the battery plate for providing a substantially uniform current density throughout the battery plate.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved battery plate for an electric storage battery comprising a plurality of metallic fibers with the plurality of metallic fibers being substantially randomly oriented in a web. Each of the plurality of metallic fibers is fused to an adjacent one of the plurality of metallic fibers for forming a conductive battery plate with a multiplicity of pores defined therein.

In a more specific embodiment of the invention, each of the plurality of metallic fibers has a substantially cylindrical shape with a major diameter with each of the plurality of metallic fibers having a length at least one thousand times the major diameter. Preferably, the plurality of metallic fibers comprises a plurality of major diameter metallic fibers and a plurality of minor diameter metallic fibers. The major diameter metallic fibers have a diameter at least twice the diameter of each of the minor diameter fibers.

In one embodiment of the invention, the plurality of metallic fibers are substantially randomly oriented within the web in multiple planes with each of the plurality of metallic fibers being fused to adjacent metallic fibers by sintering the web. The plurality of metallic fibers are flexible for providing a flexible battery plate. The plurality of metallic fibers are resilient for resiliently interlocking an active plate material into the multiplicity of pores of the battery plate.

The invention is also incorporated into the method of making a battery plate for an electric storage battery, comprising the steps of forming a tow of metallic fibers and severing the tow of metallic fibers. The severed metallic fibers are formed into a web and the metallic fibers are opened to provide loose metallic fibers. The loose metallic fibers are fused within the web in a sintering process to form a battery plate.

In a more specific embodiment of the method of the invention, the step of forming a tow of metallic fibers includes cladding and drawing a plurality of metallic wires for providing a drawn cladding with a reduced diameter and removing the cladding to provide the fiber tow. The metallic fibers are drawn to have a substantially cylindrical shape with a major diameter. The tow of metallic fibers is severed to provide metallic fibers having a length at least one thousand times the major diameter.

In one embodiment of the invention, a portion of the tow of metallic fibers are formed to have a major diameter and a portion of the tow of metallic fibers are formed to have a minor diameter with the major diameter being at least twice the minor diameter. The metallic fibers are fused within the web by sintering the web for providing an electrically conductive battery plate having a multiplicity of pores therein with a high mechanical strength.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is an isometric view of an example of an electric storage battery;

FIG. 2 is an isometric view of a partially rolled electric storage battery of FIG. 1 illustrating an anode battery plate, a cathode battery plate and a separator;

FIG. 3 is a magnified partial view of the battery plate of the present invention suitable for use with the electric storage battery of FIG. 1;

FIG. 4 is a magnified partial view similar to FIG. 3 of the battery plate of the present invention with an active plate material thereon;

FIG. 5 is a block diagram of a first method of producing a fiber tow for fabricating a first embodiment of the battery plate shown in FIGS. 3 and 4;

FIG. 5A is an enlarged cross-sectional view of the Clad 1, Single Wire in FIG. 5;

FIG. 5B is an enlarged cross-sectional view of the Multiple Draw and Anneal in FIG. 5;

FIG. 5C is an enlarged cross-sectional view of the Clad 2, Multiple Clad 1 in FIG. 5;

FIG. 5D is an enlarged cross-sectional view of the Multiple Draw and Anneal in FIG. 5;

FIG. 5E is an enlarged cross-sectional view of the Clad 3, Multiple Clad 2 in FIG. 5;

FIG. 5F is an enlarged cross-sectional view of the Multiple Draw and Anneal in FIG. 5;

FIG. 6 is a block diagram of a second method of producing a fiber tow for fabricating a second embodiment of the battery plate shown in FIGS. 3 and 4;

FIG. 6A is an enlarged cross-sectional view of the Clad 1, Single Wire in FIG. 6;

FIG. 6B is an enlarged cross-sectional view of the Multiple Draw and Anneal in FIG. 6;

FIG. 6C is an enlarged cross-sectional view of the Additional Draw and Anneal in FIG. 6;

FIG. 6D is an enlarged cross-sectional view of the Clad 2. Multiple Clad 1 in FIG. 6;

FIG. 6E is an enlarged cross-sectional view of the Multiple Draw and Anneal in FIG. 6;

FIG. 6F is an enlarged cross-sectional view of the Clad 3, Multiple Clad 2 in FIG. 6;

FIG. 6G is an enlarged cross-sectional view of the Multiple Draw and Anneal in FIG. 6;

Similar reference characters refer to similar parts throughout the several Figures of the drawings.

DETAILED DISCUSSION

Figure 7:
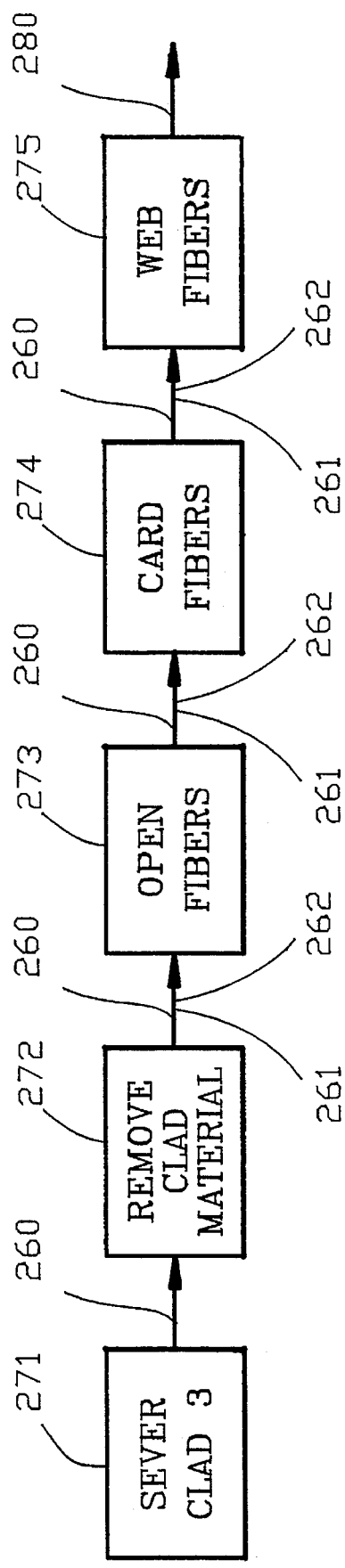
FIG. 7 is a block diagram of the method of making a web of metallic fibers.

FIG. 1 is an isometric view of an example of an electric storage battery 10 of the present invention. FIG. 2 illustrates the internal configuration of the electric storage battery 10 of FIG. 1. The electric storage battery 10 comprises an anode 11 and a cathode 12 with a separator 13 interposed therebetween. The anode 11, the cathode 12 and the separator 13 are established in an adjacent relationship and rolled to form a cylindrical battery configuration. The anode 11 and the cathode 12 are respectively connected to anode and cathode terminals 16 and 18 by conventional means (not shown) as should be well known in the art. The anode 11 comprises an anode plate 21 constructed of a porous material with an anode active material 31 disposed in the pores of the anode plate 21. The cathode 12 comprises a cathode plate 22 constructed of a porous material with a cathode active material 32 disposed in the pores of the cathode plate 22. The anode active material 31 and the cathode active material 32 is commonly referred to as a battery paste. The anode plate 21 and the cathode plate 22 are constructed of a conductive material for providing electrical conductivity between the anode active material 31 and the cathode active material 32 with the anode plate 21 and the cathode plate 22, respectively, as should be well known to those skilled in the art.

FIG. 3 is a magnified view of a portion of the improved battery plate 40 of the present invention comprising a plurality of metallic fibers 50. Each of the plurality of metallic fibers 50 is formed of a flexible and resilient solid metallic material for providing a flexible battery plate 21. The type of metallic material used for forming the battery plate 40 is selected by the type of battery to be constructed as well as the active material used and the polarity of the battery plate.

Each of the plurality of metallic fibers 50 has a substantially cylindrical shape with a major diameter D and a substantially uniform length L. Preferably, each of the plurality of metallic fibers 50 has a length L at least one thousand times the major diameter D. As shown in FIG. 3, the plurality of metallic fibers 50 are substantially randomly oriented in multiple planes of the battery plate 40. Each of the plurality of metallic fibers 50 is fused to an adjacent one of the plurality of metallic fibers 50 for forming the conductive battery plate 40 with a multiplicity of pores 60 defined therein. The plurality of metallic fibers 50 are fused to adjacent metallic fibers 50 in the same plane as well as adjacent planes of the multiple layer battery plate 40 to form a three dimensional metallic fiber matrix having multiple layers of adjacent metallic fibers 50 with the multiplicity of pores 60 defined therein. Preferably, the plurality of metallic fibers 50 are fused to adjacent metallic fibers 50 by a sintering process.

Optionally, the plurality of metallic fibers 50 comprises a mixture of a plurality of major diameter metallic fibers 51 and a plurality of minor diameter metallic fibers 52. Each of the plurality of major metallic fibers 51 has a major diameter (D) and a substantially uniform length (L). Each of the plurality of minor metallic fibers 52 has a minor diameter (d) and a substantially uniform length (l). Preferably, the major diameter metallic fibers 51 having a major diameter (D) at least twice the minor diameter (d) of each of the minor diameter fibers 52. The length L of each of the plurality of major metallic fibers 51 is equal to the length (l) of each of the plurality of minor diameter metallic fibers 52.

In one example of the invention, the plurality of major metallic fibers 51 and the plurality of minor metallic fibers 52 are formed of a nickel metallic material. The plurality of major metallic fibers 51 have a major diameter (D) of 4.0 microns and a substantially uniform length (L) of 2.54 centimeters. The plurality of minor metallic fibers 52 have a minor diameter (d) of 2.0 microns and a substantially uniform length (l) of 2.54 centimeters. The specific ratio of the plurality of major metallic fibers 51 to the plurality of minor metallic fibers 52 may be determined by the desired porosity of the battery plate 40, the metallic materials used and the process for making the metallic fibers 50.

FIG. 4 is a magnified view similar to FIG. 3 illustrating the improved battery plate 40 of FIG. 3 with the active material 65 thereon. The active material 65 is pressed into the pores 60 in the battery plate 40 in a conventional manner. The plurality of metallic fibers 50 are resilient for resiliently interlocking the active plate material 65 into the multiplicity of pores 60 of the battery plate 40. In addition, the plurality of metallic fibers 50 resiliently interlock the active material 65 within the multiple layers of adjacent fibers 50.

The cylindrical shape of adjacent metallic fibers 50 create generally wedge-shape regions which entrap the active material 65 for insuring that the active material 65 is maintained in electrical conductivity with the battery plate 40 during vibration, shock and the like. It is further believed that during the pasting process, the resilient metallic fibers resiliently deform when the active material 65 is pressed within the battery plate 40 by an external pressure. The resilient deformation of the metallic fibers 50 produces a resilient bias which resiliently maintains the active material 65 within the battery plate 40. The resilient bias continues to maintain the active material 65 within the battery plate 40 as the active material 65 is depleted from the battery plate 40. As the active material 65 is depleted from the battery plate 40, the resiliency bias of the metallic fibers 50 return the metallic fibers 50 toward a non-deformed condition which maintains the engagement of the metallic fibers 50 with the active material 65. The resiliency bias of the metallic fibers 50 insure that the active material 65 maintains in electrical conductivity with the battery plate 40 even after substantial depletion of the active material 65.

FIG. 5 is a block diagram of a first method of producing a fiber tow for fabricating a first embodiment of the battery plate shown in FIGS. 3 and 4. The first method of making a fiber tow provides uniform diameter metallic fibers from a metallic wire 110 through the use of a first, second and third cladding 111–113. The metallic wire 110 is selected to be resistant to a removal process such as being resistant to a selected acid or as being resistant to a selected electrolysis process.

FIG. 5 illustrates a first cladding process 121 for cladding the metallic wire 110 with a cladding material 116 to provide the first cladding 111. The cladding material 116 is selected to be removable in a removal process such as being soluble in a selected acid or as being removable in a selected electrolysis process as will be described in greater detail hereinafter. Preferably, the cladding material 116 is a strip of material that is bent to circumscribe the outer diameter 110D of the metallic wire 110.

FIG. 5A is a cross-sectional view of the first cladding 111 having an outer diameter 111D. Preferably, the first cladding 111 is continuously passed through the annealing oven having an inert atmosphere.

FIG. 5 illustrates a drawing and annealing process 122 of the first cladding 111. Preferably, the drawing and annealing process 122 of the first cladding 111 includes the successive drawing and annealing of the first cladding 111 for reducing the outer diameter 111D.

FIG. 5B is a cross-sectional view of the first cladding 111 after passing through the drawing and annealing process 122.

FIG. 5 illustrates a second cladding process 123 for cladding a plurality of the first claddings 111 with the cladding material 116 to provide the second cladding 112.

FIG. 5C is a cross-sectional view of the second cladding 112 illustrating an array of a plurality of the first claddings 111 within the second cladding 112.

FIG. 5 illustrates a drawing and annealing process 124 of the second cladding 112. Preferably, the drawing and annealing process 124 of the second cladding 112 includes the successive drawing and annealing of the second cladding 112 for reducing the outer diameter 111D.

FIG. 5D is a cross-sectional view of the second cladding 112 after passing through the drawing and annealing process 124.

FIG. 5 illustrates a third cladding process 125 for cladding a plurality of the second claddings 112 with a cladding material 116 to provide the third cladding 113.

FIG. 5E is a cross-sectional view of the third cladding 113 illustrating an array of a plurality of the second claddings 112 within the third cladding 113.

FIG. 5 illustrates the drawing and annealing process 126 of the third cladding 113. Preferably, the drawing and annealing process 126 of the third cladding 113 includes the successive drawing and annealing of the third cladding 113 for reducing the outer diameter 111D.

FIG. 5F is a cross-sectional view of the third cladding 113 after passing through the drawing and annealing process 126.

FIG. 6 is a block diagram of a second method of producing a fiber tow for fabricating a second embodiment of the battery plate 40 shown in FIGS. 3 and 4. The second method of making a fiber tow provides major diameter metallic fibers 141 and provides minor diameter metallic fibers 142 from a metallic wire 210 through the use of a first, second and third cladding 211–213.

FIG. 6A is a cross-sectional view of the first cladding 211 having an outer diameter 211D. Preferably, the first cladding 211 is continuously passed through the annealing oven having an inert atmosphere.

FIG. 6 illustrates a drawing and annealing process 222 of the first cladding 211. Preferably, the drawing and annealing process 222 of the first cladding 211 includes the successive drawing and annealing of the first cladding 211 for reducing the outer diameter 211D.

After the first cladding 211 is passed through the drawing and annealing process 222, the first cladding 211 is separated into a primary portion 241 and a secondary portion 242. The secondary portion 242 of the first cladding 211 is passed through an additional or further draw and annealing process 222A for further reducing the outer diameter 211D.

FIG. 6B is a cross-sectional view of the primary portion 241 of the first cladding 211 after passing through the drawing and annealing process 222. FIG. 6C is a cross-sectional view of the secondary portion 242 of the first cladding 211 after passing through the additional or further drawing and annealing process 222A. The first cladding 211 in the primary portion 241 defines a major diameter whereas the first cladding 211 in the secondary portion 242 defines a minor diameter. The minor diameter of the secondary portion 242 of the first cladding 211 has a substantially smaller cross-sectional area relative to the major diameter of the primary portion 241 of the first cladding 211.

FIG. 6 illustrates a second cladding process 223 for cladding a plurality of the primary portion 241 and a plurality of the secondary portions 242 of the first claddings 211 with a cladding material 216 to provide the second cladding 212.

FIG. 6D is a cross-sectional view of the second cladding 212 illustrating an array of a plurality of the primary and secondary portions 241 and 242 of the first claddings 211 within the second cladding 212.

FIG. 6 illustrates a drawing and annealing process 24 of the second cladding 224. Preferably, the drawing and annealing process 224 of the second cladding 212 includes the successive drawing and annealing of the second cladding 212 for reducing the outer diameter 211D.

FIG. 6E is a cross-sectional view of the second cladding 212 after passing through the drawing and annealing process 224.

FIG. 6 illustrates a third cladding process 225 for cladding a plurality of the second claddings 212 with a cladding material 216 to provide the third cladding 213.

FIG. 6F is a cross-sectional view of the third cladding 213 illustrating an array of a plurality of the second claddings 212 within the third cladding 213.

FIG. 6 illustrates a drawing and annealing process 226 of the third cladding 213. Preferably, the drawing and annealing process 226 of the third cladding 213 includes the successive drawing and annealing of the third cladding 213 for reducing the outer diameter 211D.

FIG. 6G is a cross-sectional view of the third cladding 213 after passing through the drawing and annealing process 226.

FIG. 7 is a block diagram of the processing of the third cladding 213 to provide a fiber tow 250 having the major diameter metallic fibers 141 and the minor diameter metallic fibers 142. The third cladding 213 is passed through the severing device 271 for breaking the third cladding 213 into segment of a desired length. The severed segments of the third cladding 213 is subjected to the removing process 272 to remove the cladding material 216 to produce metallic fibers 270 of a desired length. The cladding removing process 272 may be a leaching process wherein the third cladding 213 is immersed into an acid for dissolving an acid soluble cladding material 216. In the alternative, the removing process 272 may include an electrolysis process for removing the cladding material 216.

The metallic fibers 260 comprises a plurality of major wire fibers 261 and a plurality of minor wire fibers 262. Each of the plurality of major wire fibers 261 has a major diameter whereas each of the plurality of minor wire fibers 262 has a minor diameter. The ratio of primary portion 241 to the secondary portion 242 in the second cladding 212 determines the ratio of the quantity of major wire fibers 261 to the quantity of the minor wire fibers 262.

After completion of the removing process 272, wire fibers 260 are separated or opened into individual loose metallic fibers 260. The individual loose metallic fibers 260 are subjected to an optional carder 274 for carding the wire fibers 260. The optional carder 274 bends each of the metallic fibers 260 to facilitate interconnection and interlinking when the metallic fibers 260 are formed into a web 280. The bends further facilitate the random orientation and substantially uniform distribution of the minor wire fibers 262 within the major wire fibers 261. The carded wire fibers 260 are formed into a web 280 by a weber 275.

Figure 8:
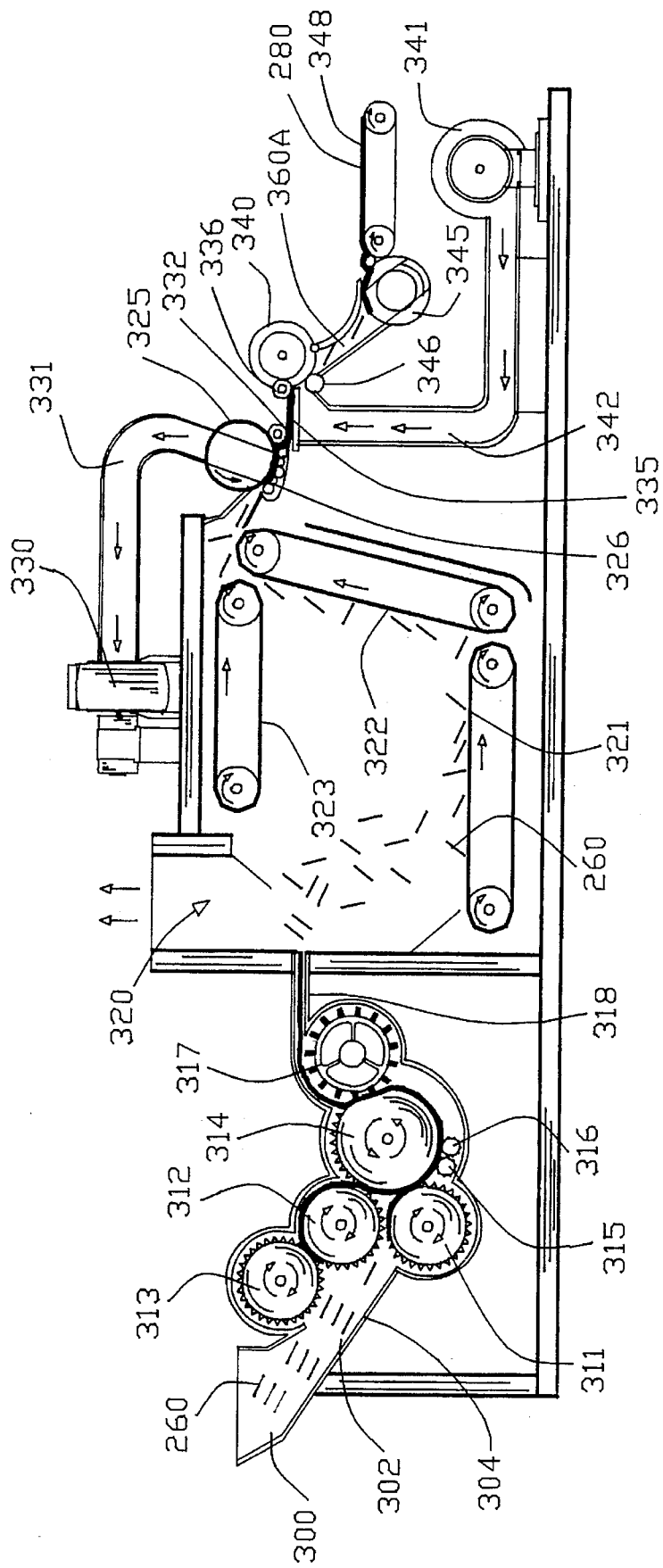
FIG. 8 is a diagram of the process for separating and randomly orienting the metallic fibers to form a web.

FIG. 8 is a diagram of the process for separating and randomly orienting the metallic fibers 260 to form a web 280. The substantially parallel metallic fibers 260 are placed in a hopper 300 and are conveyed by an inclined plane 302 to housing 304 containing a plurality of rollers 311–318. The inclined plane 302 directs the metallic fibers 260 to rotating opener rollers 311 and 312 for partially opening the metallic fibers 260. The partially opened metallic fibers 260 pass from the opposite rotating opener rollers 311 and 312 to the main opener cylinder 314. The rotating opener roller 313 returns excess metallic fibers 260 to the hopper 300. The partially opened metallic fibers 260 pass between the main opener cylinder 314 and a working roller 315 and a stripper roller 316 that cooperate with the main opener cylinder 314 for further opening and blending the metallic fibers 260. The opened and blended metallic fibers 260 are passed through an air roller 317 for subjecting the metallic fibers 260 to a high velocity air stream and for transferring the metallic fibers 260 through a conduit 318 to an air separator 320.

The air separator 320 further separates and opens the metallic fibers 260 by high velocity air. The opened metallic fibers 260 settle onto a horizontal conveyor 321 and are moved to an elevating conveyor 322. The metallic fibers 260 are passed between the elevating conveyor 322 and a stripper conveyor 323 to return any excess of the opened metallic fibers 260 to the horizontal conveyor 321. The metallic fibers 260 passing between the elevating conveyor 322 and the stripper conveyor 323 are projected by the elevating conveyor 322 to a first condenser screen 325 and a plurality of roller conveyors 326.

The first condenser screen 325 is provided with an air flow by a blower 330 through a suction duct 331 as indicated by the arrows. The air pressure above the first condenser screen 325 is below atmospheric pressure and accordingly the air-flow passes through the first condenser screen 325 into the suction duct 331 as indicated by the arrows to determine the quantity of the metallic fibers 260 attracted to the first condenser screen 325. As the metallic fibers 260 accumulate on the first condenser screen 325, the air flow passing through the first condenser screen 325 is proportionally reduced until an equilibrium is reached and a continuous and uniform mat of metallic fibers 332 are disposed upon the first condenser screen 325.

The uniform mat of metallic fibers 332 is moved over a feed plate 335 by feed rollers 336 to a lickerin 340. The uniform mat of metallic fibers 341 are combed by the lickerin 340 for producing individual metallic fibers 260A. The individual metallic fibers 260A are directed by an air stream provided by a blower 341 and a pressure duct 342 to a second condenser screen 345. The velocity of the air stream generated by the blower 341 is controlled by an opening between the lickerin 340 and a saber 346. The saber 346 is mounted on an eccentric (not shown) for varying the opening between the lickerin 340 and a saber 346 to control the air flow therethrough.

As the metallic fibers 260A accumulate on the second condenser screen 345, the air flow passing through the second condenser screen 345 is proportionally reduced until an equilibrium is reached and a continuous and uniform web of metallic fibers 280 is disposed upon the second condenser screen 345. The uniform web of metallic fibers 280 is directed to an output conveyor 348 for completing the process of making the web 280.

Figure 9:
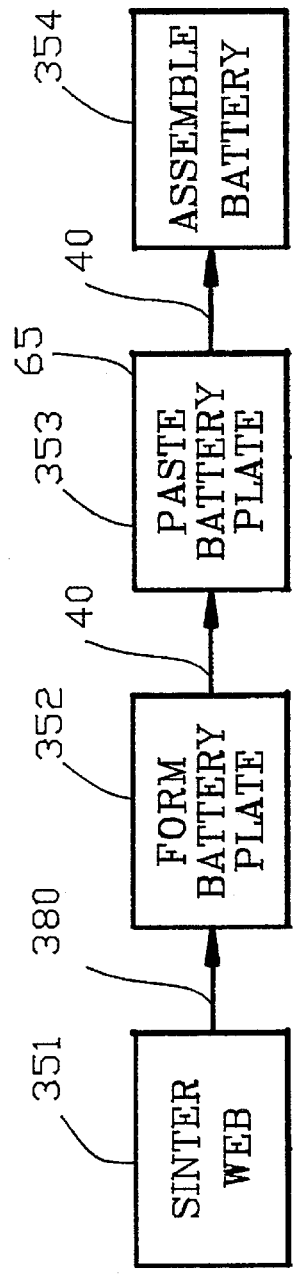
FIG. 9 is a block diagram of the method of making the electric storage battery of FIG. 1.

FIG. 9 is a block diagram of the method of making the electric storage battery of FIG. 1. The web 280 is subjected to a sintering process 351 for fusing the metallic fibers 260 within the web 280. The web 280 subjected to a process 352 to form the battery plate 40. The battery plate 40 is passed through a pasting process 353 for adding the active material 65 to the battery plate 40. The pasted battery plate 40 is then processed through a final assembly 354 for adding the anode and cathode terminals 16 and 18.

The improved battery plate of the present invention has a number of advantages over the battery plates of the prior art. Typically, the fibers forming the battery plate are normally 12 to 25 millimeters long with a diameter of 1.0 micron to 30.0 microns. The metallic fibers are extremely strong and bend when the battery plate is rolled into a cylindrical configuration without any loss of conductivity of the metallic fibers. Accordingly, each of the metallic fibers is assured electrical conductivity for a dimension of 12 to 25 millimeters. In contrast, the battery plates of the prior art made of powdered materials is only assured electrical conductivity across the diameter of the powdered particle. Although each of the metallic fibers has a relatively large linear dimension, it has a very small diameter dimension compared to metallic formed plates of the prior art. Accordingly, the electrical conductivity between the active material and the battery plate in the present invention is much shorter in distance than the prior art metallic battery plates. Furthermore, as can be seen in FIG. 3, the metallic fibers form multiple layers in the matrix to further reduce the short distance between the active material and the battery plate.

Another advantage of the present invention is the maximum contact between adjacent metallic fibers at points along the respective length of each of the fibers in the sintering process. Each of the metallic fibers has a cylindrical to cylinder contact with adjacent fibers which can be carefully controlled in the sintering oven to insure a proper fusing of the materials. The cylindrical to cylinder contact insures a high electrical conductivity between adjacent metallic fibers while allowing the improved battery plate to flex and bend for use in large variety of battery configurations.

A further advantage of the present invention is the multiple layers of the cylindrical fibers entrapping the active material therein. Adjacent cylindrical fibers form wedge-shape regions which entrap the active material therein for insuring that the active material is maintained in electrical conductivity with the battery plate through vibration, shock and the like. It is further believed that during the pasting process, the metallic fibers resiliently bend to accommodate for the active material when the active material is forced within the battery plate by an active pressure. This flexing of the metallic fibers produces a resiliency which resiliently holds the active material within the improved battery plate. Furthermore, it is further believed that as the active material is depleted from the battery plate, the resiliency of the metallic fibers urge the metallic fibers to the undistorted position which maintains the engagement with the active material to insure that the active material maintains the electrical conductivity with the battery plate even when the active material is substantially depleted. A battery plate 40 having a porosity of 95% to 98% is possible through the use of the present invention.

Table I illustrates the physical and electrical characteristics of four prior art battery plates used commercially in the art. The Celmet battery plate is constructed of a nickel foam material in accordance with the teaching of U.S. Pat. No. 4,251,603. The Nihon Seison and Katayama battery plates are constructed of a nickel coated plastic material.

The specifications set forth in Table I are either the specifications of the manufacturers or are measured parameters. The resistance values set forth in Tables I and II were measured between two positions 10.0 centimeters apart on a strip of battery plate 1.0 centimeters wide and 12.0 centimeters in length. The ABS value of the pore size distribution indicates the maximum limiting pore diameter or the maximum diameter of a particle that can pass through the battery plate. The percentage of the pore size distribution was determined by a wet flow test. The percentage of the pore size distribution indicates the pore size at which that percentage of flow is passing through pores of the indicated diameter or smaller.

The value for the ABS was determined by a wet bubble point test whereas the values for the 98%, 90% and 50% pore size distribution were statistically determined by a combination of the wet bubble point test and a dry air flow test. The values of Tables I and II are believed to accurately reflect the true porosity and to provide a true comparison of porosity values for the battery plates.

TABLE I

| CHARACTERISTICS PRIOR ART BATTERY PLATES | | | |
|---|---|---|---|
| MEDIA | CELMET | NIHON SEISON | KATA-YAMA |
| Porosity (%) | 94.5 | 90.0 | 94.0 |
| Base Weight (oz/yd$^2$) | 16.2 | 12.5 | 12.7 |
| Thickness (mm) | 1.5 | 1.0 | 1.2 |
| Tensile Strength (psi) | 170 | 120 | 168 |
| Resistance (m$\Omega$) | 39 | 80 | 83 |
| Resistivity (m$\Omega$) | 0.69 | 0.80 | 0.83 |
| Pore Size Distribution ($\mu$m) | | | |
| ABS | 265 | 180 | 215 |
| 98% | 265 | 145 | 155 |
| 90% | 260 | 125 | 125 |
| 50% | 185 | 80 | 75 |

Table II illustrates the physical and electrical characteristics of the first embodiment of the improved battery plate 40 of the present invention. The eight types of specimens of the improved battery plate 40 were all made from 25 micron nickel fiber.

TABLE II

| | NICKEL FIBER BATTERY PLATE (25 $\mu$m) | | | | | | | |
|---|---|---|---|---|---|---|---|---|
| PROPERTY | 1 | 2 | 3 | 4 | 5 | 6 | 7 | 8 |
| Porosity (%) | 95% | 95% | 95.5 | 95.5 | 96.0 | 96.0 | 96.5 | 96.5 |
| Base Weight (oz/yd$^2$) | 13.5 | 17.5 | 13.5 | 17.5 | 13.5 | 17.5 | 13.5 | 17.5 |
| Thickness (mm) | 1.0 | 1.3 | 1.1 | 1.5 | 1.3 | 1.7 | 1.5 | 1.9 |
| Tensile Strength (psi) | 230 | 230 | 210 | 210 | 180 | 180 | 165 | 165 |
| Resistance (m$\Omega$) | 55 | 40 | 55 | 40 | 55 | 40 | 55 | 40 |
| Resistivity (m$\Omega$-cm) | 0.75 | 0.47 | 0.83 | 0.54 | 0.98 | 0.61 | 1.13 | 0.69 |
| Pore Size Distribution ($\mu$m) | | | | | | | | |
| ARS | 200 | 200 | 220 | 220 | 250 | 250 | 260 | 260 |
| 98% | 200 | 200 | 210 | 210 | 230 | 230 | 250 | 250 |
| 90% | 190 | 190 | 190 | 190 | 210 | 210 | 240 | 240 |
| 50% | 125 | 125 | 125 | 125 | 135 | 135 | 160 | 185 |

A comparison of Table I and Table II reveals the superior performance of the improved battery plate 40 over the battery plates of the prior art. The improved battery plate 40 has superior resistivity, porosity and tensile strength over the battery plates of the prior art.

Typically, the volume of the battery plate is measured by a liquid displacement process for determining the porosity of the battery plate. It should be realized that the porosity of the improved battery plate 40 is an accurate porosity since the metallic fibers 260 are solid fibers. In many cases, the stated porosity of the powdered or plated plastic battery plates of the prior art are inaccurate since the powdered or plated plastic materials have internal voids or filler materials of different densities that are incapable of receiving active material. The porosities of Table I are based on estimates of the determined porosity values as set forth above. Accordingly, the performance of the improved battery plate 40 over the battery plates of the prior art is believed to be as indicated in Tables I and 11.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. The method of making a battery plate for an electric storage battery, comprising the steps of:

cladding a metallic wire with a cladding material to provide a first cladding;

drawing the first cladding for reducing the diameter thereof to have a major diameter;

further drawing a portion of the first cladding having the major diameter for reducing the diameter thereof to have a minor diameter;

forming an array of a plurality of the first drawn claddings having the major diameter and a plurality of first drawn claddings having the minor diameter;

cladding the array of the plurality of the first drawn claddings having the major diameter and the plurality of the first drawn claddings having the minor diameter to provide a second cladding;

drawing the second cladding for reducing the diameter thereof;

removing the cladding material to provide a fiber tow comprising metallic wires having the major diameter and metallic fibers having the minor diameter;

severing the fiber tow into uniform length to provide metallic fibers;

forming the metallic fibers into a web; and sintering the web to form a battery plate.

2. The method of making a battery plate as set forth in claim 1, wherein the step of forming a tow of metallic fibers includes forming each of the metallic fibers to have a substantially cylindrical shape.

3. The method of making a battery plate as set forth in claim 1, wherein the step severing the tow of metallic fibers includes severing the fiber tow to provide metallic fibers having a length at least one thousand times the major diameter.

4. The method of making a battery plate as set forth in claim 1, wherein the step of forming the metallic fibers into a web includes randomly orienting the metallic fibers into a matrix within the web.

5. The method of making a battery plate as set forth in claim 1, wherein the step of sintering the metallic fibers within the web includes sintering the web for fusing adjacent fibers to provide an electrically conductive battery plate with a multiplicity of pores defined between adjacent fibers for receiving an active material therein: and pasting an active material within the multiplicity of pores defined between adjacent fibers of the web.

6. The method of making a battery plate for an electric storage battery, comprising the steps of:

cladding a metallic wire with a cladding material to provide a first cladding;

drawing the first cladding for reducing the diameter thereof to have a major diameter;

further drawing a portion of the first cladding having the major diameter for reducing the diameter thereof to have a minor diameter;

forming an array of a plurality of the first drawn claddings having the major diameter and a plurality of first drawn claddings having the minor diameter;

cladding the array of the plurality of the first drawn claddings having the major diameter and the plurality of the first drawn claddings having the minor diameter to provide a second cladding;

drawing the second cladding for reducing the diameter thereof;

removing the cladding material to provide a fiber tow comprising metallic wires having the major diameter and metallic fibers having the minor diameter;

severing the fiber tow into lengths to provide metallic fibers;

forming the metallic fibers into a web; and sintering the web to form a battery plate.

7. The method of making a battery plate as set forth in claim 6, wherein the step of forming a tow of metallic fibers includes forming each of the metallic fibers to have a substantially cylindrical shape.

8. The method of making a battery plate as set forth in claim 6, wherein the step severing the tow of metallic fibers includes severing the fiber tow to provide metallic fibers having a length at least one thousand times the major diameter.

9. The method of making a battery plate as set forth in claim 6, wherein the step of forming the metallic fibers into a web includes randomly orienting the metallic fibers into a matrix within the web.

10. The method of making a battery plate as set forth in claim 6, wherein the step of sintering the metallic fibers within the web includes sintering the web for fusing adjacent fibers to provide an electrically conductive battery plate with a multiplicity of pores defined between adjacent fibers for receiving an active material therein; and pasting an active material within the multiplicity of pores defined between adjacent fibers of the web.

11. The method of making a battery plate for an electric storage battery, comprising the steps of:

cladding a metallic wire with a cladding material to provide a first cladding;

drawing of the first cladding for reducing the diameter thereof to have a major diameter;

forming an array of a plurality of the first drawn claddings having the major diameter;

cladding the array of the plurality of the first claddings with the reduced diameter to provide a second cladding;

drawing the second cladding for reducing the diameter thereof;

removing the second cladding and the plurality of the first claddings to provide a fiber tow comprising metallic wires having the reduced diameter;

severing the fiber tow to provide metallic fibers;

forming the metallic fibers into a web; and sintering the web to form a battery plate.

12. The method of making a battery plate as set forth in claim 11, wherein the step of forming a tow of metallic fibers includes forming each of the metallic fibers to have a substantially cylindrical shape.

13. The method of making a battery plate as set forth in claim 11, wherein the step severing the tow of metallic fibers includes severing the fiber tow to provide metallic fibers having a length at least one thousand times the major diameter.

14. The method of making a battery plate as set forth in claim 11, wherein the step of forming the metallic fibers into a web includes randomly orienting the metallic fibers into a matrix within the web.

15. The method of making a battery plate as set forth in claim 11, wherein the step of sintering the metallic fibers within the web includes sintering the web for fusing adjacent fibers to provide an electrically conductive battery plate with a multiplicity of pores defined between adjacent fibers for receiving an active material therein; and pasting an active material within the multiplicity of pores defined between adjacent fibers of the web.

* * * * *